United States Patent [11] 3,588,503

[72] Inventor Harold C. Brill
Wilmington, Del.
[21] Appl. No. 811,652
[22] Filed Mar. 28, 1969
[45] Patented June 28, 1971
[73] Assignee E. I. du Pont De Nemours and Company
Wilmington, Del.

[54] COATINGS SENSITIVE TO ULTRAVIOLET LIGHT AND PHOTOGRAPHIC METHOD FOR USING SAID COATINGS
13 Claims, No Drawings

[52] U.S. Cl. .......... 250/65, 96/88, 117/72, 260/38
[51] Int. Cl. .......... G03b 41/00, C08g 51/04
[50] Field of Search .......... 96/88; 250/65, 65 (F); 260/38; 117/72; 252/300

[56] References Cited
UNITED STATES PATENTS

| | | | |
|---|---|---|---|
| 2,482,814 | 9/1949 | Urbach | 250/65 |
| 3,316,204 | 4/1967 | Lederer | 260/38 |

*Primary Examiner*—James W. Lawrence
*Assistant Examiner*—A. L. Birch
*Attorney*—Frank R. Ortolani

ABSTRACT: A composition which darkens on exposure to shortwave invisible light and returns to its original brightness on subsequent removal of the effective radiation is prepared by mixing a hydroxylated titanium or niobium compound in finely divided form with an aldehyde, preferably polymeric in nature, such as urea-formaldehyde or phenol-formaldehyde. The corresponding niobium compounds may be substituted in part or whole for the titanium compounds.

COATINGS SENSITIVE TO ULTRAVIOLET LIGHT AND PHOTOGRAPHIC METHOD FOR USING SAID COATINGS

BACKGROUND OF THE INVENTION

This invention pertains to photosensitive compositions and particularly to photosensitive compositions in which radiant energy causes darkening. More particularly, this invention relates to photosensitive compositions which revert to their original undarkened state upon removal of the radiant energy source.

Most known photosensitive compositions require a chemical development step after exposure to produce an image. In contrast to the prior art, the compositions of this invention will darken upon exposure. The prior art products can only be used once, whereas the unique reversing feature of this invention allows the composition to be reused.

Titanium dioxide in the pigmentary form of crystalline particles with an average diameter between 0.1 and 0.3 microns has heretofore been recognized as light sensitive. For example, usual paint compositions containing titanium dioxide exhibit discoloration upon exposure to sunlight. This discoloration is only sufficient to destroy the desired pure whiteness inherent in the paint. The light sensitivity of crystalline titanium dioxide has been utilized in the photoreproduction art as disclosed in U.S. Pat. No. 3,152,903.

SUMMARY OF THE INVENTION

The reversible, photosensitive composition of this invention is a mixture of a finely divided hydroxylated titanium or niobium compound and an aldehyde. The hydroxylated titanium compound, unlike anhydrous crystalline titanium dioxide, is, by itself, light-stable. However, this mixture will darken upon exposure to ultraviolet or X-ray radiant energy hereinafter referred to as shortwave, invisible radiation. The darkening appears to be a result of a chemical reduction of the metal compound to a lower valence state. The removal of the activating energy allows the original white color to return. This reversal or bleaching reaction appears to be in competition with the darkening reaction. It has been found that the bleaching reaction is more rapid at elevated temperatures and in the presence of atmospheric oxygen.

The titanium compounds which are used in the composition of this invention include titanic acid and its water stable organic derivatives. The organic derivatives can be obtained by partial hydrolysis of the various organic titanates. The molecular weight of the organic groups is not critical; however, the low molecular weight hydrocarbons such as ethyl and propyl, hydroxyalkyl radicals, such as gylceryl and the acyl radicals are preferred for economic reasons. Titanium compounds such as titanium glycolate, titanium glycerate, titanium acetyl acetonate, titanium lactate and the alkanolamine titanates are suitable for this invention and have been found to produce the more transparent coatings capable of the photochemical activity. Hydroxy-titanium compounds containing chelating organic groups are water soluble or water dispersible stable agents which are especially useful in aqueous systems. These compounds are used in a finely divided form, for example, less than 0.01 microns in diameter. The particles are amorphous or are of a very low order of crystallinity.

The water stable hydrolysis products of the organic derivatives of orthotitanic acid such as the tetraalkyl titanates, $Ti(OR)_4$ where R is a hydrocarbon, are useful starting materials in this invention. For example, the undried hydrolysis products of the tetraisopropyl titanate is among the most ultraviolet sensitive compositions. The hydrolysis product of $TiCl_4$ or titanyl sulfate can also be used. The products from these acid solutions are more sensitive if precipitated cold by neutralization of the acid than if the products are obtained by thermal hydrolysis. All of these compounds are thought to contain hydroxyl groups after contact with water.

The compounds may be condensed; that is, the hydroxyl units on the titanium may condense with each other by eliminating water to form polymeric structures. As this type of condensation proceeds, the photosensitivity decreases.

In addition to the titanium compounds mentioned, the analogous compounds of niobium, e.g., the derivatives of niobic acid, such as $Nb(OH)_5$ or $NbO(OH)_3$, may also be used. These two groups of compounds appear to be unique among the many metal hydroxides which are white or colorless. The more highly substituted organic derivatives of these amphoteric acids of titanium and niobium such as tetraisopropyl titanate, tetrabutyl titanate, and triisopropyl oxyniobate tend to be soluble in organic systems and hence, may be incorporated in a lacquer type coating to yield, initially, relatively transparent films. Further examples of hydrolyzable and partially hydrolyzable organic titanates, all of which are applicable to this invention, are disclosed in U.S. Pat. No. 2,943,955. These compounds may also be used in aqueous formulations since they are quickly hydrolyzed or partially hydrolyzed. The more highly hydroxylated compounds appear to respond most rapidly to ultraviolet radiation.

The term aldehyde is intended to include formaldehyde and the higher molecular weight aldehydes such as acetaldehyde, propionaldehyde, butyraldehyde and isobutyraldehyde, as well as compounds from which formaldehyde is readily available such as acetal, acetal resins, and hexamethylenetetraamine. Free formaldehyde is very effective, but due to its strong odor and volatility, it is less desirable than the higher molecular weight aldehydic compounds such as paraformaldehyde, phenol-formaldehyde, melamine-formaldehyde, urea-formaldehyde, resorcinal-formaldehyde and the like. A mixture of 25 parts by weight of urea and 60 parts of formaldehyde in water is uniquely stable and is a preferred aldehyde for aqueous compositions.

The active constituents of the composition are the hydroxylated titanium compound and the aldehyde. The overall reaction is thought to be expressed as $$2Ti(OH)_4+HCHO \rightarrow 2Ti(OH)_3+HCOOH+H_20$$

The relative amounts of these compounds, calculated as equivalents of $Ti(OH)_4$ and HCHO, are not critical to the operation of this invention. The only requirements are that the titanium compound and the aldehyde be brought into close association so that the reaction can take place in a reasonable length of time and that there be a sufficient quantity of the components so that the reaction can proceed with visible darkening. The preferable weight ratios are between 100 and 0.01 weight units of $Ti(OH)_4$ per weight unit of HCHO.

In addition to the essential ingredients described above, film forming materials, dispersing agents, binders, solvents and the like may be incorporated in the composition. Water-base formulations appear to be more readily reversible, presumably because of the permeability to atmospheric oxygen. For films, 10to 30 percent by weight of the active ingredient mixture in the dry film is very satisfactory.

When the compositions are exposed to the effective radiation, the coating darkens at varying speeds ranging from about 1 minute to several minutes. The effective excitation sources include the ultraviolet range and the X-ray range of radiation. The composition is relatively unaffected by visible light making it possible to use these materials in ordinary room light without recourse to the cumbersome protective measures needed with the usual photographic materials. The most effective radiation for the photographic darkening procedure is in the 3,600 to 4,000 range. Radiation of 2,500 has been found to be satisfactory for the operation of this invention.

Upon removing the ultraviolet source or other effective radiation or decreasing it below the effective level of energy and preferably continuing exposure to atmospheric oxygen, the darkened film reverses to its original light color. This cycle may be repeated almost indefinitely in most cases. The reversible cycle appears to be the result of two competing reactions; the darkening reaction occurring under the activating influence of the effective radiation, and the bleaching reaction which reoxidizes the reduced metal to its high valence, colorless, state. It has been found that the reversing or oxidizing portion of the cycle is speeded up by increasing the temperature. It is possible, by virtue of controlling the sensitivity through a choice of reactants and through the porosity of the coating, to establish a critical relationship between these reactions so that a coating exposed to daylight will darken in cold weather, but will remain white in hot weather. Such a coating, for example, may be applied to a roof to reflect heat during hot days and absorb heat when it is cold. In this manner, economy may be realized with respect to both heating and cooling costs in a house. Another application for such a coating would be on green houses to regulate the inside temperature. Tests have shown that this cycle can be repeated over 300 times without any detrimental effect to the composition. Since this cycle can be repeated many times, it is possible to prepare a paper coated in accordance with this invention which may be used for photocopying in a temporary manner with the possibility of reusing the same paper almost indefinitely.

This invention is also applicable to uses in which the darkening is permanent. It has been found that the life of the images can be prolonged by excluding oxygen, for example, by coating the surface with a transparent, air impervious material. This prolonging may be accomplished by pressing or rolling a sheet or coating of clear plastic over the sensitive surface. Paper, due to its porosity, should be protected on both sides. Coatings may be more of the same resin or polymer used in the light sensitive composition. Any clear film such as cellulose acetate, polyethylene, polypropylene, lacquers, and polyethylene terphthalate would be satisfactory, preferably with a pressure sensitive adhesive backing. When such protective films are added, after the image is formed, hot pressing should be avoided to prevent destroying the image by accelerating the reaction with residual oxygen under the cover. The air impervious film can also be attached before exposing the composition giving particularly advantageous results where long image life is desired.

A direct positive image may be obtained on the surfaces by first exposing the complete surface area until darkened. This darkened area can then be exposed in a thermal printer, for example, under infrared radiation, until bleaching occurs in the exposed area leaving the positive image. The life of this image may then be extended by sealing it from atmospheric oxygen.

The following examples will further illustrate the novel composition.

EXAMPLE 1

This example illustrates the preparation of a coated panel and the testing of its reversible light sensitivity through successive cycles of alternate exposure to sunlight and darkness in air. Titanic acid was prepared by mixing tetrabutyl titanate with crushed ice and water. The titanic acid from the resulting hydrolysis reaction was recovered by filtration and washing. The filter cake was preserved in the wet state. Analysis: 18.5 percent $Ti(OH)_4$. The following components were slurried briefly in a high-speed blender.

54.0 gms. of the wet cake
81.0 gms. water
2.4 ml. of 25 percent soln. of sodium hexametaphosphate
1.0 gm. NaOH This slurry was transferred to a vessel fitted with a low-speed agitator and 40.0 gms. of a commercial preparation of urea-formaldehyde containing 25 percent urea, 60 percent formaldehyde and 15 percent water by weight were stirred in the mixture followed by 18.0 gms. of an acid-containing acrylic emulsion copolymer as a thickener and film hardener. This composition was brushed onto a standard 4 inch ×12 inch exposure panel dried and placed on the inside of a south window. The panel darkened in 1 to 5 minutes in daylight depending on the brilliance of the sunlight. At night the panel bleached to its original white color. This cycle continued daily for more than a year without appreciable loss of photosensitivity. During the day when the panel was dark it was occasionally placed in a warm air oven whereupon it reverted to the white state in a few seconds.

EXAMPLE 2

This example illustrates the preparation and use of a water resistant photosensitive paper. Titanic acid was prepared as in example 1, except that the washed precipitate was dried at 110° C. and ground to a −325 mesh powder. The following mixture was prepared.

10 gms. of the −325 mesh titanic acid
100 gms. water
40 gms. melamine formaldehyde
$NH_4Cl$ to adjust pH to 5.0 in order to render the melamine polymer water resistant
2 percent methyl cellulose, 50,000 cps. solution to adjust viscosity to brushing consistency This coating material, somewhat less sensitive to the ultraviolet radiation than that in example 1, was brushed onto a sheet of bond paper and dried. Exposure, through contacting a negative of a line drawing to ultraviolet radiation, produced a positive print. Erasure of parts of the image by touching with the point of a warm soldering iron is possible due to oxidation of the dark areas at the elevated temperatures. The image faded on prolonged exposure to atmospheric oxygen. The life of the image can be extended by cold pressing a sheet of adhesive backed polyethylene terphthalate on both front and back of the paper.

EXAMPLE 3

In this example the preparation of a heat-controlled roof coating is illustrated. To 100 gms. of a commercial preparation of urea-formaldehyde containing 15 percent water, 60 percent formaldehyde and 25 percent urea, is added 25 gms. of urea. This step is done to assure a final water insoluble coating. The following mixtures are added to a rotating blender in the order given.

500 gms. of crushed stone roofing granules
10 gms. of titanic acid (dried powder)
40 gms. of the urea-formaldehyde preparation
Water to give sufficient liquid to wet the granules
$(NH_4)_2SO_4$ to adjust pH to 4.5

The ammonium sulfate is an acid catalyst to set, or polymerize, the urea-formaldehyde resin, rendering the composition water resistant. Tumbling is continued until the coating is set. The coated granules are spread on a panel freshly coated with soft asphalt. When this panel is exposed on a roof the sunlight tends to darken the coating. However, when the ambient temperature is high, the air oxidation reaction becomes predominant overcoming the effect of the ultraviolet radiation and the surface turns white reflecting the sun's heat. In cold weather this reversal does not occur and the coating remains dark, absorbing heat. At night the bleaching occurs slowly due to oxidation . The heat control by absorption at the dark surface during daylight hours is of course the main objective.

EXAMPLE 4

This example illustrates the use of ultraviolet sensitive coatings which exhibit changes from substantially transparent to dark opaque. To produce a screen of this type, a sheet of clear plastic is coated with a preparation which is transparent in its oxidized state. In this case glyceryl titanate is used as the active titanium compound. This may be prepared from $TiCl_4$ by hydrolysis in ice water to produce titanic acid which is filtered and washed to give a wet cake containing about 10 percent $Ti(OH)_4$. 329 gms. of this cake are mixed with 92 gms. of glycerine and 5 gms. of NaOH and heated at 265° C. until it appears clear or translucent. To prepare the coating, the following are mixed using the usual laboratory low speed stirrer:

55.3 gms. glyceryl titanate (18 percent $Ti(OH)_4$)
40.0 gms. of the urea-formaldehyde preparation in example 1
9.0 gms. acid containing acrylic emulsion copolymer
5 cc. 50 percent $NH_4OH$ solution This coating solution is applied to the clear plastic panel and dried. This panel will darken on exposure to sunlight and clear when removed from direct sunlight. This provided means for producing window shades or curtains which automatically control the entrance of sunlight. The coating is also suitable for application to window glass.

EXAMPLE 5

This example illustrates the use of hexamethylenetetraamine as the aldehydic agent. A mixture of 10 gms. of hexamethylenetetraamine, 10 gms. of titanic acid precipitated from a titanium chloride solution with ammonia, washed and dried at 110° C., and 60 ml. of water is made and thoroughly stirred. The pH of this mixture is then lowered to about 4 with sulfuric acid in order to accelerate the liberation of formaldehyde from the hexamethylenetetraamine. This mixture when drawn out as a thin film or coating and exposed to ultraviolet light becomes grey in about 5 minutes under a lamp somewhat less intense in ultraviolet radiation than bright sunlight. The grey is bleached in a few minutes by removing it from under the lamp and warming to 60°—90° C. The grey color develops again under the lamp.

EXAMPLE 6

This example illustrates the use of niobium in the invention. Example 1 is repeated except that a solution of $NbCl_5$ in conc. HCl is added to ice water and neutralized to precipitate niobium hydroxide which is filtered and washed. The resulting coating behaves in a manner similar to the titanic acid preparation when exposed to ultraviolet radiation.

EXAMPLE 7

This example illustrates the use of an X-ray energy source for activating the composition. Hydrous titanium oxide in wet cake form equivalent to 5 gms. $TiO_2$ is mixed with 20 ml. of urea-formaldehyde containing 25 percent urea, 60 percent formaldehyde and 15 percent water. The mixture is spread on paper with a drawdown blade having a 6 mil. clearance and then dried in air. The following responses were obtained from an exposure 2 inches from a platinum target of an X-ray tube operating at 50 k.v. and 50 m.a.:

| Exposure | Result |
|---|---|
| 3 sec | No visible darkening. |
| 10 sec | Slight visible darkening. |
| 30 sec | Proportionate darkening. |
| 45 sec | Proportionate darkening. |
| 60 sec | Proportionate darkening. |
| 3 min | Black. |

These darkened images fade appreciably on aging at room temperature for a month.

I claim:

1. A short wave, invisible radiation sensitive composition being reversible upon discontinuing the radiation comprising an aldehyde and a member of the group consisting of titanic acid, niobic acid and hydroxylated organic titanates and niobates.

2. Claim 1 wherein the aldehyde is melamine formaldehyde, paraformaldehyde, phenol-formaldehyde, resorcinol formaldeyhde, or urea-formaldehyde.

3. Claim 1 wherein the aldehyde is hexamethylenetetraamine.

4. Claim 1 wherein the aldehyde is acetal or acetal resins.

5. Claim 1 wherein the titanic acid is the hydrolysis product of titanium tetrachloride.

6. Claim 1 wherein the organic titanate is the hydrolysis product of $Ti(OR)_4$ where R is an alkyl group of 1 to 8 carbon atoms.

7. Claim 1 wherein the organic titanate is titanium glycolate, titanium glycerate, titanium acetyl acetonate, titanium lactate, or an alkanolamine titanate.

8. Claim 1 wherein the composition is an emulsion.

9. A roof coating composition having therein a mixture of an aldeyhde and a member of the group consisting of titanic acid, niobic acid, and hydroxylated organic titanates and niobates.

10. The coating of claim 9 wherein the aldehyde is urea-formaldehyde and wherein the composition further includes roofing granules and a waterproofing acid catalyst.

11. A substrate coated with a mixture of an aldehyde and a member of the group consisting of titanic acid, niobic acid, and hydroxylated organic titanates and niobates.

12. Claim 11 wherein an air impervious film is placed on the coating.

13. The method of producing a positive image comprising exposing the composition of claim 1 to short wave, invisible radiation until darkened and then subjecting the darkened composition to infrared radiation which is projected through a positive transparency.